Patented June 13, 1950

2,511,400

UNITED STATES PATENT OFFICE

2,511,400

PREPARATION OF METALLIC OXIDES FOR REDUCTION

Fredrik W. de Jahn, New York, N. Y., assignor to H. A. Brassert & Company, New York, N. Y., a corporation of Illinois No Drawing. Application July 23, 1946, Serial No. 685,768

2 Claims. (Cl. 75—3)

This invention relates to the treatment of metallic oxides, and has particular reference to the preparation of oxides of the iron group, especially iron ores and the iron oxides, for efficient and complete reduction by a gaseous reductant, such as hydrogen.

As is well known, iron oxides, such as magnetite, hematite, limonite, calcined ferrous sulfate, mill scale, and the like, may be directly reduced without fusion by means of a reducing gas such as hydrogen. If such oxides are finely-divided, as is usually necessary in order to obtain a high degree of gangue elimination, reduction in that finely-divided state is difficult unless catalysts are added, and even then the reduction period is long and the temperature of reduction must be carefully controlled and be held well below 900° C. in order to preclude fritting of the particles and consequent clogging of the reducing furnace. Many of the difficulties of reducing finely-divided iron oxides are eliminated if, before reduction, the fines are agglomerated into nodules without compaction and then baked to form self-sustaining porous units, according to the process disclosed in Patent No. 2,131,006, issued September 20, 1938, to Reginald S. Dean, and the present invention is an improvement on that process.

As is suggested in the Dean patent, in the case of very pure iron ores, such as magnetite concentrate of a fineness on the order of 35.3% passing a 200 mesh screen, it is desirable to add a binder to increase the strength of the finished nodules, among the suggested binders being finely ground silica, Portland cement, clay, or the like. It would be expected that a binder would enhance the strength of the nodule, and would be desirable for that reason in the case of fine pure ores, because very fine particles, particularly when rounded as is the product of a ball mill, have only infinitesimally small contact points and therefore would apparently require some cohesive or adhesive second ingredient unless considerably compacted, and that is undesirable because it results in a material decrease in the porosity of the nodule and its permeability by reducing gas, such as hydrogen.

Contrary to expectations, it has been found that even where iron ores and other iron oxides are extremely finely-divided in order to obtain the highest possible concentration, such as magnetic concentration of magnetites, the particles adhere together in a nodule after baking, without requiring compaction or a separate binder, to form a strong unit which is highly porous so as to be permeable to reducing gas, and is not readily friable so that it is capable of withstanding gravity-feeding without breakage, providing the proper proportion of water is mixed with the fines before formation into nodules and the water retained therein until expelled by heat.

In accordance with the present invention, the metallic oxide, such as magnetic iron ore, is ground exceedingly fine, on the order of less than 5% remaining on a 270 mesh screen, is saturated with water to a degree such that the interstices between the contacting particles are filled with water, the resulting paste-like mass is formed into nodules without compaction so that each nodule retains substantially all of the water of saturation in the interstices between the particles that the nodule mass contained before formation into the nodule, and finally the wet nodules are baked in a quiescent state until all of the water in the interstices between the particles in the nodules has been evaporated, thus leaving a nodular matrix composed of contacting fine oxide particles arranged in their original wet state with connected pores between them constituted by the interstices from which the water has been expelled during the heating step.

Concentration may be, and preferably is, effected after grinding, in order that a substantially virgin metal product results after reduction, and in case the starting material is magnetite or contains magnetic particles, the aforementioned heating step is preferably conducted in an oxidizing atmosphere at temperatures somewhat higher than those required to merely bake the nodule into a hard self-sustaining unit, so that the magnetic material is calcined to hematitic material with the advantage of reducibility with hydrogen at lower temperatures, and the like, as described in copending application Serial No. 621,854, filed October 11, 1945, now abandoned, by H. A. Brassert and applicant.

More particularly, the iron oxide, whether ore or mill scale, for example, is ground in a ball mill with water until only about 3.5% remains on a 270 mesh screen, and 75–80% passes a 325 mesh screen. Even finer grinding may be effected but it has been found that little or no additional advantages justifying the cost are obtained when the material is ground finer than that stated above. Preferably these fines are concentrated to remove residual gangue, which may be conveniently done in a wet concentrator such as a log washer, magnetic separator, or the like, depending upon requirements. In any event, whether or not further concentration is effected, the finely ground mass is saturated with water, e. g., that remaining therein from wet grinding or wet concentration. In general, the finely-divided material is mixed with that amount of water, usually during grinding, which fills the interstices between the contacting particles when the latter are formed into nodules without compaction, the relation of water to fines by volume depending upon the degree of fineness and the requirements of good nodule-making practice.

Before any drying and without substantial compaction, the saturated mass is formed into nodules, preferably between about one-half and one inch in diameter, these nodules retaining substantially the same amount of water as did the initial quantity that was used to make the nodule. One suitable method of making the nodules without compaction and so that they retain the water of saturation, is to allow them to extrude by gravity through a horizontal one-half to one-inch mesh screen which is vibrated in a horizontal direction. Because of such vibration the extruded extensions break off when about twice as long as their diameters. The nodules so formed comprise an agglomeration of rounded particles in point contact with the connected interstices between them filled by the water of saturation. Because of this large amount of water, the nodules, although they retain their general shape and dimensions when quiescent, tend to flatten out if allowed to drop more than an inch or two, and to preclude said distortion, they are collected immediately from the underside of the screen when they break off.

Preliminary air drying of the saturated nodules in a quiescent state may be effected, but such air-dried nodules are highly friable and have such low strength that they cannot be again transferred without substantial breakage. Therefore, although somewhat more heat is required, it has been found more feasible to heat-dry them at once while wet, and in a quiescent state, at temperatures between about 1000° C. and 1350° C. The same particle and interstice relationship and arrangement is retained in the baked nodule as occurred in the original saturated mass, the particles in contact with each other forming a matrix-like structure in which a myriad of almost infinitesimally small connected pores occur. Consequently the nodules are highly porous and when a reducing gas permeates the nodules, virtually each tiny particles is more or less enveloped in the gas, thus making for complete and rapid reduction of the entire nodule, as will be explained.

Notwithstanding the absence of a binder, the nodules so formed are very strong and may be handled without substantial breakage, as by shovelling, dumping, gravity-chuting, and the like. The temperature, in any case, should be under the softening temperature, because otherwise the particles would tend to coalesce and run together, thus impairing the high porosity desired for the nodule. Temperatures above 1000° C. depend largely upon the nature of the oxides. For example, the fines are frequently magnetite or include magnetic particles so that it is desirable to calcine or roast the nodules by conducting the heating or baking step in an oxidizing atmosphere, such as air, in order to convert the magnetic oxides ($Fe_3O_4$) into hematitic oxides ($Fe_2O_3$), for reasons previously stated. If the raw material is ore, the higher calcining temperatures between about 1200 and about 1350° C. will be required, whereas if the raw material is relatively pure iron oxide, such as mill scale, lower calcining temperatures, on the order of about 1000 to about 1100° C. will be sufficient to effect the hematitic conversion. The time of nodule baking or calcining depends upon the nature of the material and the temperature, but it is usually completed in about an hour.

Reduction of these highly porous oxide materials may be carried out in a stream of hydrogen, preferably admixed with an inert gas such as nitrogen, to provide the proper heat content without requiring excessive volumes of hydrogen for that purpose, as disclosed in copending application Serial No. 684,714, filed July 19, 1946, by applicant. The reducing furnace may be of the shaft type through which the nodules descend by gravity, being preferably preheated to say 600° C. and heated to the reducing temperature between 750 and 1000° C., by the preheated gaseous mixture of hydrogen and nitrogen, as stated. Reduction takes place between about one and one-half hours under these conditions and is complete in each nodule, owing to the high porosity thereof, and the virtual integrity of each particle therein, due to the method of forming the nodule according to this invention.

Although the invention has been described in connection with the preparation of finely-divided iron oxides for reduction by a gaseous reductant, it is to be understood that the invention is not limited thereto but is equally applicable to the preparation of other oxides of the iron group, as well as being susceptible to changes within the scope of the appended claims.

I claim:

1. The method of preparing iron oxides for reduction by a gaseous reductant, which consists in grinding an iron oxide of even the greatest purity to a fineness such that about 75 to about 80% passes a 325 mesh screen, saturating the finely-ground oxide with water to a degree that the interstices between the contacting particles are filled with water, supplying said water-saturated oxide to a substantially horizontal screen having apertures therein between about one-half inch and one inch across, vibrating said screen to extrude said oxide through said apertures and form it into self-sustaining nodules without compacting to retain substantially all of said water of saturation in the interstices between the contacting particles of the nodule, and immediately subjecting said saturated nodules in a quiescent state to a baking temperature between about 1000° C. and 1350° C. to evaporate all of the water in the interstices between the particles of the nodule, whereby each nodule is composed of contacting fine oxide particles substantially in their original wet arrangement and with connected pores between them constituted by said interstices from which the water has been expelled by said baking step.

2. The method of preparing iron oxide for reduction by a gaseous reductant, which consists in grinding iron oxide of even the greatest purity to a particle size such that more than about 75% thereof passes a 325 mesh screen when dry, saturating the finely ground oxide with water, supplying said water saturated oxide to a substantially horizontal screen having apertures therein between about one-half inch and one inch across, vibrating said screen to extrude said oxide through said apertures and form the oxide into self-sustaining nodules without substantial compaction while wet and while the interstices between the particles making up the nodules are filled with water, and immediately baking the nodules in a quiescent state at a temperature between about 1000° C. and the softening point of the particles until all of the water in the interstices between the contacting particles of the nodules is expelled to produce impact resistant nodules each consisting of a matrix of contacting fine oxide particles substantially in their original wet arrangement and with connected pores between them constituted by the said interstices from which the water has been expelled by baking.

FREDRIK W. DE JAHN.

REFERENCES CITED

The following references are of record in the file of this patent:

UNITED STATES PATENTS

| Number | Name | Date |
|---|---|---|
| 1,789,895 | Fassotte | Jan. 20, 1931 |
| 2,131,006 | Dean | Sept. 20, 1938 |

OTHER REFERENCES

A. I. M. M. E., "Blast Furnace and Raw Materials Committee," Proceedings, vol. 4 (1944), pages 48–54.